June 10, 1941.　　　H. GUGEL　　　2,245,192
ELECTROMAGNETIC CONTROLLER
Filed Oct. 14, 1938

Inventor:
Hans Gugel,
by Harry E. Dunham
His Attorney.

Patented June 10, 1941

2,245,192

UNITED STATES PATENT OFFICE 2,245,192

ELECTROMAGNETIC CONTROLLER

Hans Gugel, Berlin-Oberschoneweide, Germany, assignor to General Electric Company, a corporation of New York Application October 14, 1938, Serial No. 234,995
In Germany February 19, 1938

14 Claims. (Cl. 171—119)

This invention relates to electromagnetic controllers and more particularly to improvements in variable voltage transformers.

It is broadly old in the art to vary the voltage of a transformer by controlling its leakage flux. The present invention is directed to improvements in arrangements of this kind and, in its preferred form, is characterized by varying the reluctance of both the main flux and leakage flux paths of the transformer.

A convenient way of controlling the reluctance of these paths is by saturating portions thereof with unidirectional flux. In this manner the control may be secured efficiently, with high amplification ratio, and without the use of moving parts.

The invention will be better understood from the following description taken in connection with the accompanying drawing and its scope will be pointed out in the appended claims.

Figure 1:
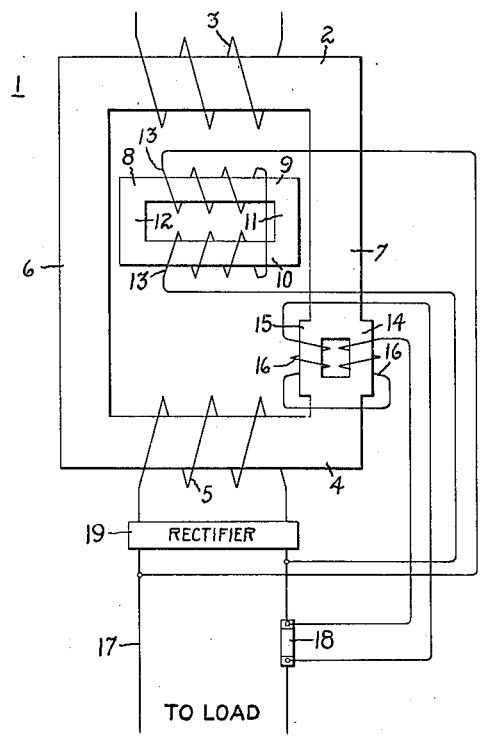
Figure 2:
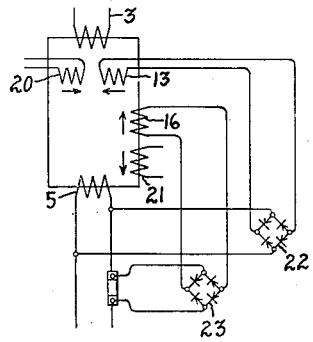

In the drawing, Fig. 1 illustrates diagrammatically an embodiment of the invention adapted for use with load circuits requiring a high starting voltage and a low operating voltage, such as arc circuits and neon lamps and Fig. 2 is a modification which is suitable for use as an automatic voltage regulator for maintaining substantially constant voltage on the output side of the transformer.

Referring now to the drawing and more particularly to Fig. 1, the transformer comprises a main core 1 having a leg 2 carrying a primary winding 3 and a leg 4 carrying a secondary winding 5 and a pair of main yoke members 6 and 7 interconnecting the two legs. In shunt with the magnetic circuit of the transformer is an auxiliary core 8 comprising legs 9 and 10 joined at their ends by yoke members 11 and 12. This auxiliary core comprises a leakage path for the transformer flux and the reluctance of this path is controlled by a pair of saturating windings 13 on the legs 9 and 10.

Additional control of the leakage flux is secured by dividing part of the yoke 7 into magnetically parallel flux paths 14 and 15 and controlling the reluctance of these parallel paths by saturating windings 16 thereon.

Both the windings 13 and the windings 16 are arranged so as to circulate unidirectional flux in local circuits comprising in the first case the auxiliary core 8 and in the second case the parallel sections 14 and 15 and the portions of the yoke 7 immediately adjacent thereto. In this manner a minimum alternating voltage will be induced in these windings.

The secondary winding 5 is connected to a load circuit 17 across which the windings 13 are connected and effectively in series with which the windings 16 are connected. Usually it is not necessary or desirable that the windings 16 carry all the load current and, therefore, a suitable shunt 18 may be provided. If the load circuit 17 is a direct current circuit a rectifier 19 of any suitable type may be employed, while if the load circuit is an alternating current circuit individual rectifiers would be connected in the circuits of the windings 13 and 16.

If the load circuit is one which requires a high open circuit voltage for starting the load device and a relatively low voltage during normal operation of the load device, the winding 13 is arranged to saturate the leakage path 8 when the load circuit is open-circuited. Examples of loads having such characteristics are neon or other gas-filled tube-type lamps and electric arc and discharge devices in general.

The operation of Fig. 1 is as follows. With no current flowing in the load circuit and assuming that the primary winding 3 is energized by any suitable source of alternating current, the secondary voltage will be a maximum because the saturation of the leakage path and the lack of current in the windings 16 will result in a minimum amount of leakage flux. If now load current commences to flow, a part of this current will traverse the windings 16 tending to saturate the parallel paths 14 and 15 in the main core and thus tending to divert some of the transformer flux through the leakage path 8. At the same time the inherent regulation of the transformer with increases in load will lower the secondary voltage, thus decreasing the energization of the windings 13 and desaturating the leakage path 8. This has the effect of increasing the leakage flux. Thus, both the windings 13 and 16 contribute to reducing the output voltage of the transformer as the load current increases.

In Fig. 2 a bias winding 20 has been added to the leakage path 8 and a bias winding 21 has been added to the parallel paths 14 and 15. These bias windings 20 and 21 may be energized in any suitable manner so as to provide a substantially constant amount of unidirectional flux. Also, in Fig. 2 the arrangement has been adapted to supply current to an alternating current load so that individual rectifiers 22 and 23 are connected respectively in the energizing circuits for the windings 13 and 16.

In order that this circuit will maintain substantially constant load voltage during normal operation thereof, the bias windings 20 and 21 are arranged so as to produce magnetomotive forces which oppose those of their associated variable windings 13 and 16. Furthermore, at no load the effects of the windings 13 and 20 substantially neutralize each other.

The operation of Fig. 2 is as follows. By reason of the fact that the windings 13 and 20 substantially neutralize each other at no load the leakage path 8 will have substantially minimum reluctance and, consequently, the maximum amount of leakage flux will be diverted from the secondary winding 5. This effect is amplified by the bias winding 21 which substantially saturates the parallel sections 14 and 15. If now the load current increases the increase in current through the winding 16 tends to desaturate the main core, thus, automatically reducing the amount of leakage flux and tending to maintain the secondary voltage. At the same time a slight decrease in load voltage will cause a net saturating effect in the shunt leakage path, thereby increasing the reluctance of this path and decreasing the amount of leakage flux and in this manner an additional effect is produced tending to minimize changes in load voltage.

By changing the relative directions of energization of either or both of the bias coils or by changing the electrical conditions to which the control coils 13 and 16 respond, the output characteristic of the transformer may be made substantially anything desired.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In a transformer, a core of magnetic material, a primary winding thereon, a secondary winding thereon, means for varying the reluctance of said core, a leakage path for part of the core flux, and means for varying the reluctance of said leakage path.

2. In a transformer, a core of magnetic material, a primary winding thereon, a secondary winding thereon, means for varying the reluctance of said core, a leakage path for part of the flux normally produced by said primary winding, and means for varying the reluctance of said leakage path.

3. In a transformer, a core of magnetic material, a primary winding thereon, a secondary winding thereon, a leakage path for part of the flux normally produced by said primary winding, means for varying the reluctance of said leakage path, and means for varying the reluctance of a part of said core which carries the remaining flux normally produced by said primary winding.

4. In a transformer, a main core of magnetic material, primary and secondary windings thereon, a magnetic leakage path for the transformer leakage flux comprising an auxiliary closed core having two portions thereof magnetically in parallel with respect to said leakage flux, means including an additional winding for circulating unidirectional flux in said auxiliary core, and means for variably saturating a portion of said main core.

5. In a transformer, a main core of magnetic material, primary and secondary windings thereon, a magnetic leakage path for the primary leakage flux comprising an auxiliary closed core having two portions thereon magnetically in parallel with respect to said leakage flux, means including windings on said portions for circulating a variable unidirectional flux in said auxiliary core, and means for variably saturating a portion of said main core.

6. In a transformer, a core of magnetic material provided with a pair of main legs joined by a pair of main yoke members, a primary winding on one of said main legs, a secondary winding on the other of said main legs, a magnetic leakage path interconnecting said main yoke members between said main legs, said leakage path comprising an auxiliary pair of legs joined by an auxiliary pair of yoke members, variably energized saturating windings on said auxiliary pair of legs, one of said main yoke members having a divided section forming two magnetically parallel flux paths between said leakage path and said secondary windings, and variably energized saturating windings on said parallel flux paths.

7. In combination, an electric circuit, means including a transformer for controlling an electrical condition of said circuit, said transformer comprising a core of magnetic material, a primary winding thereon, a secondary winding thereon, means responsive to an electrical condition of said circuit for varying the reluctance of said core, a leakage path for part of the core flux, and means for varying the reluctance of said leakage path.

8. In combination, an electric circuit, means including a transformer for controlling an electrical condition of said circuit, said transformer comprising a core of magnetic material, a primary winding thereon, a secondary winding thereon, means for varying the reluctance of said core, a leakage path for part of the core flux, and means responsive to an electrical condition of said circuit for varying the reluctance of said leakage path.

9. In combination, an electric circuit, means including a transformer for controlling an electrical condition of said circuit, said transformer comprising a core of magnetic material, a primary winding thereon, a secondary winding thereon, means responsive to an electrical condition of said circuit for varying the reluctance of said core, a leakage path for part of the core flux, and means responsive to an electrical condition of said circuit for varying the reluctance of said leakage path.

10. In combination, an electric circuit, means including a transformer for controlling an electrical condition of said circuit, said transformer comprising a core of magnetic material, a primary winding thereon, a secondary winding thereon, means responsive to the voltage of said secondary winding for varying the reluctance of said core, a leakage path for part of the core flux, and means for varying the reluctance of said leakage path.

11. In combination, an electric circuit, means including a transformer for controlling an electrical condition of said circuit, said transformer comprising a core of magnetic material, a primary winding thereon, a secondary winding thereon, means for varying the reluctance of said core, a leakage path for part of the core flux, and means responsive to the current in said secondary winding for varying the reluctance of said leakage path.

12. In combination, an electric circuit, means including a transformer for controlling an electrical condition of said circuit, said transformer comprising a core of magnetic material, a primary winding thereon, a secondary winding thereon, means responsive to the voltage of said secondary winding for varying the reluctance of said core, a leakage path for part of the core flux, and means responsive to the current in said secondary winding for varying the reluctance of said leakage path.

13. In combination, an alternating current supply circuit, a load circuit, a transformer interconnecting said circuits, a magnetically saturable leakage flux path for said transformer, a saturating winding on said path, means including a rectifier for energizing said winding in accordance with the voltage of said load circuit, a winding for saturating a portion of the core of said transformer, and means including a rectifier for energizing said last mentioned winding in accordance with the current in said load circuit.

14. In a transformer, a closed core of magnetic material, primary and secondary windings on opposite portions of said core, an intermediate portion of said core between said windings being divided into two parallel paths which are traversed by the transformer flux which is common to and threads both said primary and secondary windings, and windings on said parallel paths for circulating unidirectional flux therethrough so as magnetically to saturate said divided portion for the purpose of controlling the leakage flux of said transformer.

HANS GUGEL.

CERTIFICATE OF CORRECTION.

Patent No. 2,245,192.  June 10, 1941.

HANS GUGEL.

It is hereby certified that error appears in the printed specification of the above numbered patent requiring correction as follows: Page 2, second column, line 42, claim 8, strike out the syllable and words "mary winding thereon, a secondary winding" and insert the same after the syllable "pri-" in line 40, same claim; and that the said Letters Patent should be read with this correction therein that the same may conform to the record of the case in the Patent Office.

Signed and sealed this 22nd day of July, A. D. 1941.

(Seal)

Henry Van Arsdale,
Acting Commissioner of Patents.